(12) United States Patent
Kotzur et al.

(10) Patent No.: US 9,026,845 B2
(45) Date of Patent: May 5, 2015

(54) SYSTEM AND METHOD FOR FAILURE PROTECTION IN A STORAGE ARRAY

(75) Inventors: Gary B. Kotzur, Austin, TX (US); Kevin Marks, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 13/471,813

(22) Filed: May 15, 2012

(65) Prior Publication Data

US 2013/0311822 A1    Nov. 21, 2013

(51) Int. Cl.
*G06F 11/00* (2006.01)
*G06F 11/07* (2006.01)
*G06F 11/10* (2006.01)
*G06F 11/20* (2006.01)

(52) U.S. Cl.
CPC ........ *G06F 11/0757* (2013.01); *G06F 11/0727* (2013.01); *G06F 11/1092* (2013.01); *G06F 11/2094* (2013.01)

(58) Field of Classification Search
USPC ........................................ 714/6.22
See application file for complete search history.

(56) References Cited

U.S. PATENT DOCUMENTS

| | | | | |
|---|---|---|---|---|
| 6,321,276 | B1 * | 11/2001 | Forin | 710/3 |
| 7,734,951 | B1 * | 6/2010 | Balasubramanian et al. | 714/6.13 |
| 8,595,465 | B1 * | 11/2013 | Raz | 711/208 |
| 8,601,311 | B2 * | 12/2013 | Horn | 714/6.2 |
| 2008/0059740 | A1 * | 3/2008 | Madathilparambil et al. | 711/163 |
| 2008/0086620 | A1 * | 4/2008 | Morris | 711/203 |
| 2008/0155224 | A1 * | 6/2008 | Crandall et al. | 711/203 |
| 2011/0032865 | A1 * | 2/2011 | Richardson | 370/316 |
| 2012/0151252 | A1 * | 6/2012 | Harris et al. | 714/6.13 |
| 2012/0266050 | A1 * | 10/2012 | Cideciyan et al. | 714/773 |
| 2013/0290608 | A1 * | 10/2013 | Nelogal et al. | 711/103 |
| 2014/0089729 | A1 * | 3/2014 | Sonoda et al. | 714/6.21 |

* cited by examiner

*Primary Examiner* — Amine Riad
(74) *Attorney, Agent, or Firm* — Baker Botts L.L.P.

(57) ABSTRACT

In accordance with embodiments of the present disclosure, a system comprising may include a storage controller and a plurality of storage resources communicatively coupled to the storage controller. At least one storage resource of the storage resources may be capable of performing storage resource-level failure protection and configured to disable storage resource-level failure protection in response to a determination that the at least one storage resource is a member of a redundant storage array.

14 Claims, 3 Drawing Sheets

SYSTEM AND METHOD FOR FAILURE PROTECTION IN A STORAGE ARRAY

TECHNICAL FIELD

The present disclosure relates in general to input/output (I/O) communication, and more particularly to rebuilding and resynchronization of redundant data in a storage array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "logical unit." Implementations of storage resource arrays can range from a few storage resources disposed in a server chassis, to hundreds of storage resources disposed in one or more separate storage enclosures.

For many years, physical storage resources were typically implemented using magnetic storage media. However, in recent years, the industry has shifted to using solid-state storage devices in place of magnetic storage media. Solid-state storage devices may be desirable over magnetic storage media due to reduced latency, higher performance, fewer mechanical components, and other reasons. Increasingly, storage arrays (including RAIDs) have been implemented using solid-state storage devices. However, the use of traditional solid-state storage devices in RAIDs may have disadvantages. To illustrate, a solid-state storage device may include additional capacity for parity-based redundancy within the solid-state storage device itself. Thus, in the event of the failure within the solid-state storage device (e.g., a die failure), the solid-state storage device may rebuild data based on the parity information. In a RAID configuration of a plurality of solid-state storage devices, this device-level parity essentially provides a second layer of protection to the RAID itself. However, from a practical standpoint the additional protection provided is fairly insignificant, meaning the device-level parity overhead occupies capacity that could otherwise be used for data storage, while providing little or no significant benefit.

SUMMARY

In accordance with the teachings of the present disclosure, the disadvantages and problems associated with providing efficient failure protection in a storage array have been substantially reduced or eliminated.

In accordance with embodiments of the present disclosure, a system comprising may include a storage controller and a plurality of storage resources communicatively coupled to the storage controller. At least one storage resource of the storage resources may be capable of performing storage resource-level failure protection and configured to disable storage resource-level failure protection in response to a determination that the at least one storage resource is a member of a redundant storage array.

In accordance with these and other embodiments of the present disclosure, a storage resource capable of performing storage resource-level failure protection may include a plurality of dies, each die comprising a plurality of memory cells for electronically storing data, and a management controller communicatively coupled to the plurality of dies, and configured to disable storage resource-level failure protection in response to a determination that the storage resource is a member of a redundant storage array.

In accordance with these and other embodiments of the present disclosure, a method may include determining whether a storage resource capable of performing storage resource-level failure protection is a member of a redundant storage array. The method may also include disabling storage resource-level failure protection of the storage resource in response to a determination that the at least one storage resource is a member of a redundant storage array.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
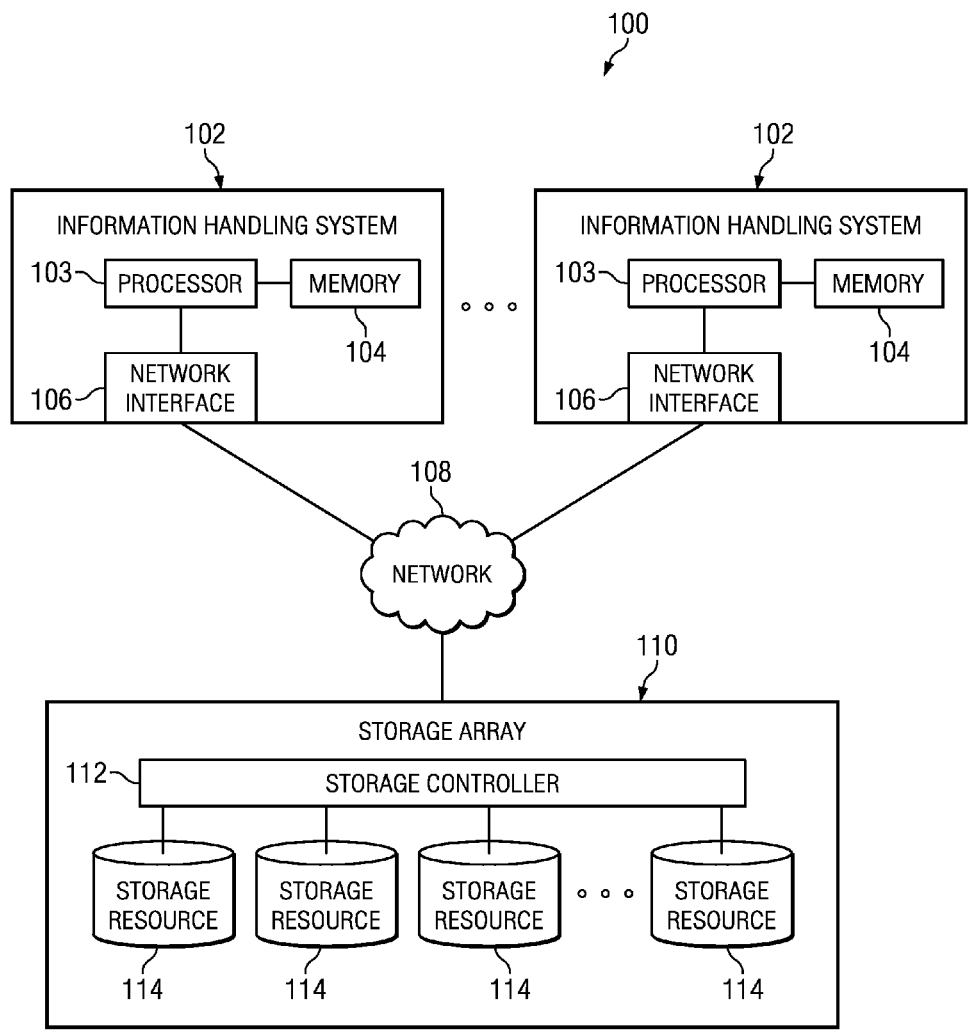
FIG. 1 illustrates a block diagram of an example system including a storage array, in accordance with embodiments of the present disclosure.

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

As discussed above, an information handling system may include or may be coupled to an array of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example system 100 including a storage array 110, in accordance with embodiments of the present disclosure. As depicted in FIG. 1, system 100 may include one or more information handling systems 102, a network 108, and a storage array 110. An information handling system 102 may comprise a processor 103, a memory 104 communicatively coupled to processor 103, and a network interface 106 communicatively coupled to processor 103. In certain embodiments, an information handling system 102 may comprise a server. In other embodiments, information handling system 102 may comprise a personal computer (e.g., a desktop computer, laptop computer, mobile computer, notebook computer, and/or handheld computer). An information handling system 102 may generally be operable to receive data from and/or communicate data to storage array 110.

A processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in an associated memory 104 and/or another component of its associated information handling system 102. In the same or alternative embodiments, processor 102 may communicate data to and/or from storage array 110 (e.g., via network 108).

A memory 104 may be communicatively coupled to an associated processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to an associated information handling system 102 is turned off.

A network interface 106 may include any suitable system, apparatus, or device operable to serve as an interface between an information handling system 102 and an external network (e.g., network 108 or other network). A network interface 106 may enable an information handling system 102 to communicate with network 108 using any suitable transmission protocol and/or standard, including without limitation all transmission protocols and/or standards enumerated below with respect to the discussion of network 108. In certain embodiments, a network interface 106 may include a network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses).

Network 108 may be a network and/or fabric configured to communicatively couple information handling systems to each other, other information handling systems, storage array 110, and/or other devices. In certain embodiments, network 108 may include a communication infrastructure, which provides physical connections, and a management layer, which organizes the physical connections of information handling systems 102 and other devices coupled to network 108. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any storage and/or communication protocol, including without limitation, Fibre Channel, Frame Relay, Ethernet Asynchronous Transfer Mode (ATM), Internet protocol (IP), or other packet-based protocol, and/or any combination thereof. Network 108 and its various components may be implemented using hardware, software, or any combination thereof.

Storage array 110 may comprise any system, device, or apparatus having a plurality of physical storage resources 114 communicatively coupled to network 108 and/or information handling systems 102 via storage controller 112. Storage resources 114 may include hard disk drives, magnetic tape libraries, optical disk drives, magneto-optical disk drives, compact disk drives, compact disk arrays, disk array controllers, and/or any computer-readable medium operable to store data. In particular embodiments, one or more storage resources 114 may comprise solid-state storage devices. In some embodiments, storage resources 114 may form all or part of a redundant storage array (e.g., a RAID). In such embodiments, storage resources 114 participating in the redundant storage array may appear to an operating system executing on an information handling system 102 as a single logical storage unit or virtual resource. Thus, information handling system 102 may "see" a logical unit instead of seeing each individual physical storage resource 114. Storage resources 114 may be housed in one or more storage enclosures configured to hold and power storage resources 114.

As depicted in FIG. 1, storage resources 114 may each be communicatively coupled to a storage controller 112.

Storage controller 112 may comprise any suitable system, device, or apparatus that manages physical storage resources 114 of storage array 110 and/or presents them to information handling system 102 as logical units and/or virtual storage resources, as is described in greater detail below. In some embodiments, storage controller 112 may comprise a RAID controller. For example, if a RAID is implemented using the physical storage resources 114 of storage array 110, controller 112 may control how stored data is mirrored and/or striped among physical storage resources 114, and may present such RAID as a single logical unit or virtual storage resource to information handling system 102. In some example embodiments, storage controller 112 may be an integral part of a storage enclosure housing one or more of physical storage resources 114. In other embodiments, storage controller 112 may be an integral part of information handling system 102.

Figure 2:
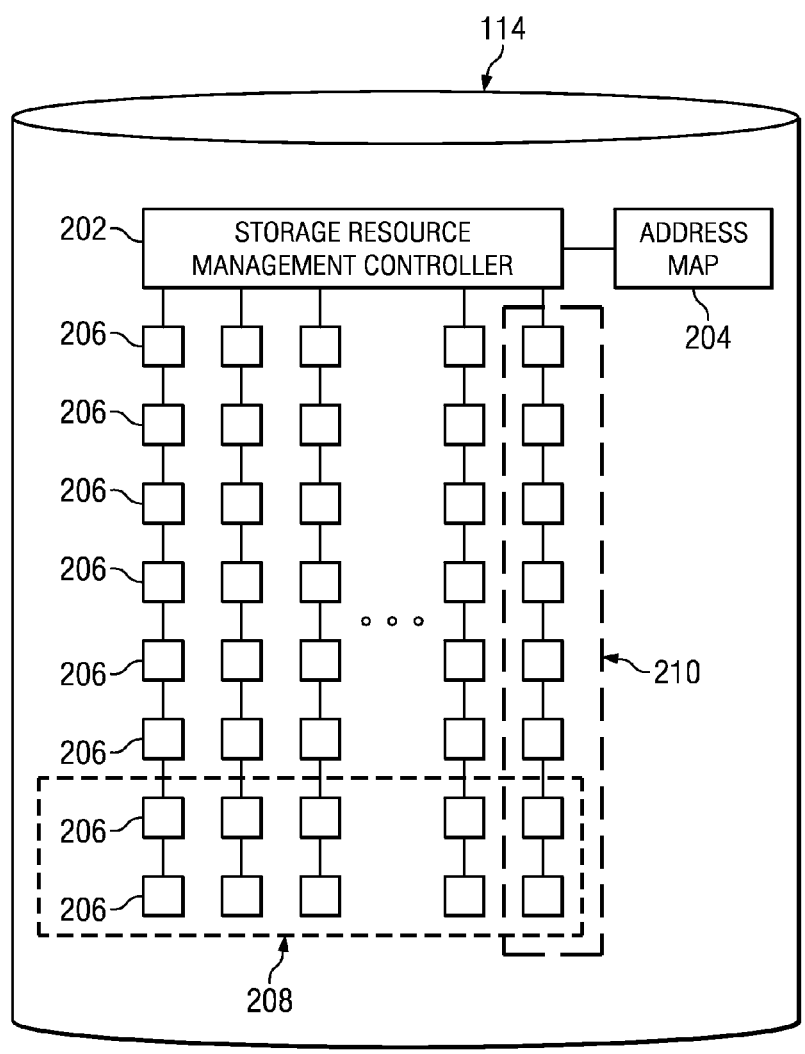
FIG. 2 illustrates a block diagram of an example storage resource, in accordance with embodiments of the present disclosure.

FIG. 2 illustrates a block diagram of an example storage resource 114, in accordance with embodiments of the present disclosure. As depicted in FIG. 2, a storage resource 114 may comprise a solid-state storage device with a storage resource management controller 202, an address map 204, and a plurality of dies 206.

Storage resource management controller 202 may comprise any system, device, or apparatus configured to bridge and/or couple individual storage components (e.g., dies 206) to information handling systems 102. In some embodiments, storage resource management controller 202 may comprise a processor embedded in a storage resource 114. In these and other embodiments, storage resource management controller 202 may execute firmware-level code to perform its various functions. Functions that may be performed by storage resource management controller 202 include, without limitation, error correction, wear leveling, bad block mapping, read scrubbing, read and write caching, garbage collection, encryption, data formatting and mapping, power management, data reclamation, write endurance management, and/or block erasure. In addition or alternatively, storage resource management controller 202 may perform functionality related to failure protection of its associated storage resource 114.

Address map 204 may include any map, table, list, or other suitable data structure accessible to storage resource management controller 202 and configured to store relationships between virtual addresses (e.g., logical block addresses) and physical addresses (e.g., physical block addresses). A virtual address may be used by an information handling system 102 and/or storage controller 112 to address particular data in storage array 110. On the other hand, a physical address may be used by a storage resource 114 to address an actual physical location of data in storage resource 114. Accordingly, storage resource management controller 202 may use address map 204 to translate a virtual address received in an input/output (I/O) request to a physical address.

A die 206 may be communicatively coupled to storage resource management controller 202 and may comprise an integrated circuit configured to electronically store data. In some embodiments, a die 206 may comprise a plurality of memory cells (e.g., NAND-based flash memory cells or NOR-based flash memory cells). A storage resource 114 may comprise any suitable arrangement or architecture of dies 206 (including, as depicted in FIG. 2, an arrangement of columns).

In some embodiments, a portion of the dies 206 present in storage resource 114 may be designated by storage resource management controller 202 as overprovisioned storage 208. Overprovisioned storage 208 may be defined as storage capacity of a storage resource that is not reported by a storage resource 114 (e.g., to an operating system of an information handling system 102) as residing within the nominal storage capacity of the storage resource 114. For example, a storage resource 114 may have a stated capacity of 8 gigabytes (GB), but may actually have 8.8 GB in storage capacity—the additional 0.8 GB of excess capacity may be overprovisioned storage. Such overprovisioned storage 208 may be present to allow for increased endurance, enhanced wear leveling, improved garbage collection, and/or improved performance. As a specific example, in the event of a failure of a die 206 or other failure within a storage resource 206, storage resource management controller 202 may de-allocate such failed die 206 and allocate a die 206 residing in the overprovisioned storage 208 to essentially replace the failed die 206. Although overprovisioned storage 208 is depicted in FIG. 2 as comprising a contiguous set of dies 206, it is understood that overprovisioned storage 208 may comprise any suitable collection of dies 206, whether contiguous or disjoint.

In these and other embodiments, a storage resource 114 may have the capability to provide for failure protection at the storage resource level. To provide for storage resource-level failure protection, storage resource management controller 202 may designated a portion of its storage capacity as parity capacity 210 (e.g., in FIG. 2, parity capacity 210 is depicted as comprising a portion of the dies 206 present in a storage resource 114). Thus, for example, in the event of a failure of a die 206, storage resource management controller 202 may, according to known techniques, rebuild the data content of the failed die to a die present within overprovisioned storage 208 based on information stored in parity capacity 210. Although parity capacity 210 is depicted in FIG. 2 as comprising a contiguous set of dies 206 in a single column, it is understood that parity capacity 210 may comprise any suitable collection of dies 206, whether contiguous or disjoint.

As described in the "Background" section above, the presence of storage resource-level failure protection, while useful when a storage resource 114 is used in a non-redundant storage environment, the parity capacity 210 provides little benefit when a storage resource 114 with storage resource-level failure protection is utilized as a member of a redundant storage array (e.g., RAID), and the parity capacity 210 effectively becomes wasted capacity.

To effectively reclaim parity capacity 210 when a storage resource is a member of a redundant storage array, storage resource management controller 202 may be configured to selectively disable storage resource-level failure protection as described in greater detail below with respect to FIG. 3, thus allowing capacity that would otherwise be used as parity capacity 210 to be used for non-parity data storage, and thus increasing the effective storage capacity of the storage resource 114. Furthermore, a storage resource management controller 202 and a storage controller 112 may be configured to operate in concert to, in response to a die failure or other failure in a storage resource 114, rebuild data from the failed area to overprovisioned storage 208 of the storage resource 114, as described in greater detail below with respect to FIG. 4.

Figure 3:
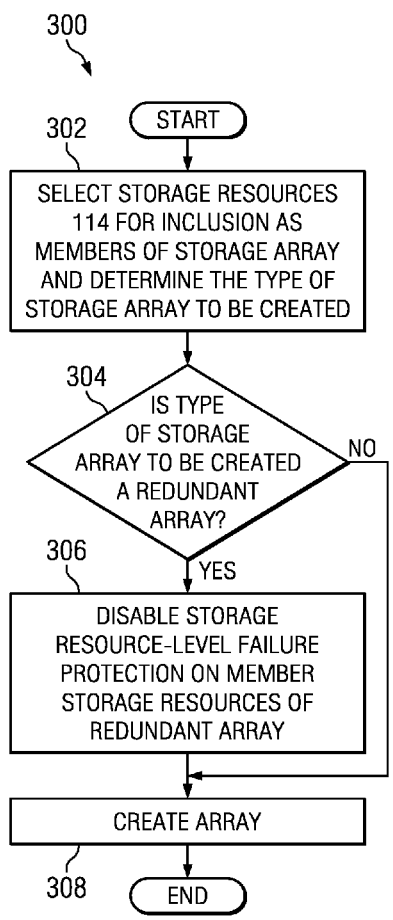
FIG. 3 illustrates a flow chart of an example method for creating a redundant storage array, in accordance with embodiments of the present disclosure.

FIG. 3 illustrates a flow chart of an example method 300 for creating a redundant storage array, in accordance with embodiments of the present disclosure. According to at least one embodiment, method 300 preferably begins at step 302. As noted above, teachings of the present disclosure may be implemented in a variety of configurations of information handling system 100. As such, the preferred initialization point for method 300 and the order of the steps 302-308 comprising method 300 may depend on the implementation chosen.

At step 302, a user and/or a storage controller 112 may select storage resources 114 for inclusion as members of a storage array (e.g., a RAID) and determine the type of storage array to be created (e.g., a RAID level of the storage array). At step 304, storage controller 112 may determine if the type of storage array to be created (e.g., the RAID level) is a redundant array. If the array is a redundant array, method 300 may proceed to step 306. Otherwise, if the array is not a redundant array, method 300 may proceed to step 308.

At step 306, in response to a determination that the array to be created is a redundant array, storage controller 112 may communicate to each member storage resource 114 of the array (or at least to each member storage resource 114 having storage resource-level failure protection capability) an indication that a redundant array is to be created. In response to such indication, each storage resource 114 having storage resource-level failure protection capability may disable storage resource-level failure protection. For example, to disable storage resource-level failure protection on a storage resource 114, storage controller 112 may communicate a Mode Page or Set Features command that would have caused internal failure protection to be disabled and the capacity dedicated to parity capacity 210 to be added to the user capacity of the storage resource 114.

At step 308, the array may be created. After completion of step 308, method 300 may end.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software embodied in tangible computer readable media.

Figure 4:
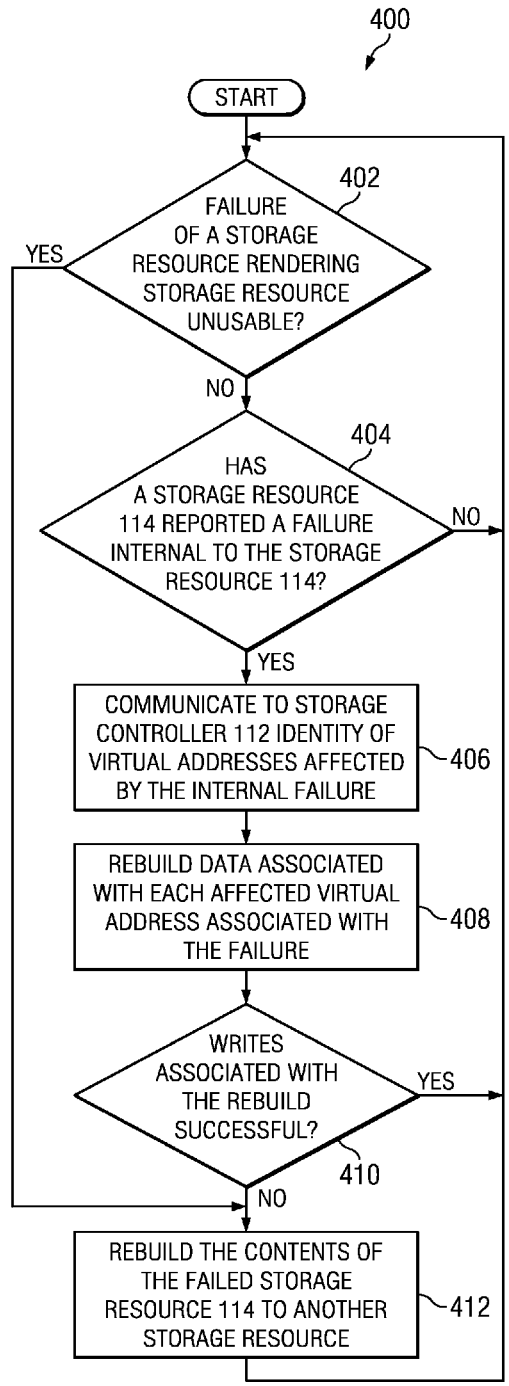
FIG. 4 illustrates a flow chart of an example method for failure protection in a redundant storage array, in accordance with embodiments of the present disclosure.

FIG. 4 illustrates a flow chart of an example method 400 for failure protection in a redundant storage array, in accordance with embodiments of the present disclosure. According to at least one embodiment, method 400 preferably begins at step 402. As noted above, teachings of the present disclosure may be implemented in a variety of configurations of information handling system 100. As such, the preferred initialization point for method 400 and the order of the steps 402-412 comprising method 400 may depend on the implementation chosen.

At step 402, storage controller 112 operating in normal conditions may determine if a failure of a storage resource 114 has occurred that renders the storage resource unusable (e.g., failure of a storage resource management controller 202 or failure of dies 206 exceeding the available overprovisioned storage of the storage resource). If a storage resource failure has occurred, method 400 may proceed to step 412. Otherwise, if no storage resource failure presently exists, method 400 may proceed to step 404.

At step 404, storage controller 112 operating in normal conditions may determine if a storage resource 114 has reported a failure internal to the storage resource 114 (e.g., failure of a die 206). An internal failure may be one that could affect data integrity or redundancy (e.g., failure of a die 202) but renders the storage resource otherwise unusable (e.g., sufficient overprovisioned storage 208 exists to rebuild data from a failed die 206). During operation, a storage resource management controller 202 may be configured to monitor for internal failures (e.g., die failures) affecting data integrity or redundancy. If an internal failure occurs in a storage resource 114, the storage resource management controller 202 of the storage resource 114 may communicate an indication of such failure to storage controller 112. Such indication communication may be implemented in any suitable manner in accordance with the relevant storage protocol. For example, in Small Computer System Interface (SCSI) storage, the indication could be reported as an Informational Exception (e.g., based on the Method of Reporting Informational Exceptions (MRIE) field in Information Exception mode page), established a UNIT ATTENTION condition or, or reported as a recovered error for read/write to an area not affected by the internal failure. As another example, in Non-Volatile Memory Host Controller Interface Specification (NVMHCI, NVM Express, or NVMe), the indication could be reported as an Asynchronous Completion Event on the Administration Queue. As an additional example, in Serial Advanced Technology Attachment, the indication may be reported via a SENSE DATA present bit. If an internal storage resource failure is reported, method 400 may proceed to step 406. Otherwise, if no internal storage resource failure is reported, method 400 may proceed again to step 402, such that steps 402 and 404 may repeat until such time as a storage resource failure or internal storage resource failure occurs.

At step 406, in response to an internal failure occurring in a storage resource 114, the storage resource management controller 202 of such storage resource 114 may communicate to storage controller 112 an identity of virtual addresses affected by the internal failure. For example, the storage resource management controller 202 may be configured to determine physical addresses associated with the failure, and based on information present in address map 204, determine virtual addresses associated with the failure and communicate such virtual addresses to storage controller 112. In order to perform this step, storage resource management controller 202 and/or storage controller 112 may read a failure log to obtain a list of addresses and/or one of storage resource management controller 202 and storage controller 112 may issue a command to the other to communicate this information.

At step 408, for each virtual address associated with the failure, storage controller 112 may rebuild data associated with each affected virtual address, based on known techniques for rebuilding data in a redundant storage array (e.g., based on data and/or parity information stored on other storage resources 114 of the redundant storage array). The data to be rebuilt may be communicated from storage controller 112 to the storage resource 114 and an I/O read request associated with each affected virtual address. The storage resource management controller 202 may write the rebuilt data to free physical capacity (e.g., overprovisioned storage 208) of the storage resource 114. Such write of data may be implemented by performing an Auto-reassign of the logical block addresses that were previously on the failed die 206 or other component of the storage resource 114. After attempting to write the rebuilt data, the storage resource 114 may communicate an indication to storage controller 112 indicating whether the write was successful (e.g., the storage resource may communicate a write protect in response to the attempt to write, possibly indicating a lack of overprovisioned storage 208 in which to perform the write).

At step 410, storage controller 112 may determine if the writes associated with the rebuild were successful. If the writes were successful, the rebuild successfully completed and method 400 may return to step 402. On the other hand, if any write associated with rebuild were unsuccessful, it may indicate a possible failure of the storage resource 114 rendering it unusable, and method 400 may proceed to step 412.

At step 412, in response to a failure of a storage resource 114 rendering it unusable, storage controller 112 may rebuild the contents of the failed storage resource 114 to another storage resource (e.g., an available hot spare storage resource or a storage resource 114 added to replace the failed storage resource) in accordance with known methods. After completion of step 412, method 400 may return again to step 402.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 100 or any other system operable to implement method 400. In certain embodiments, method 400 may be implemented partially or fully in software embodied in tangible computer readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
    a storage controller; and
    a plurality of storage resources communicatively coupled to the storage controller, at least one storage resource of the storage resources configured to:
        perform storage resource-level failure protection;
        disable storage resource-level failure protection in response to a determination that the at least one storage resource is a member of a redundant storage arrays;
        report an internal failure to the storage controller; and
        communicate to the storage controller an identity of at least one virtual address affected by the internal failure.

2. A system according to claim 1, the at least one storage resource configured to disable storage resource-level failure protection by reallocating parity capacity of the at least one storage resource to non-parity capacity of the storage resource.

3. A system according to claim 1, the storage controller comprising a Redundant Array of Independent Disks (RAID) controller and the redundant storage array comprising a RAID.

4. A system according to claim 1, the internal failure comprising a failure of a die integral to the at least one storage resource.

5. A system according to claim 1, the storage controller further configured to communicate data to be rebuilt to overprovisioned storage of the at least one storage resource based on the identity of the at least one virtual address.

6. A storage resource configured to perform storage resource-level failure protection comprising:
    a plurality of dies, each die comprising a plurality of memory cells for electronically storing data; and
    a management controller communicatively coupled to the plurality of dies, and configured to:
        disable storage resource-level failure protection in response to a determination that the storage resource is a member of a redundant storage array;
        report an internal failure to a storage controller communicatively coupled to the storage resource; and
        communicate to a storage controller communicatively coupled to the storage resource an identity of at least one virtual address affected by the internal failure.

7. A storage resource according to claim 6, the management controller configured to disable storage resource-level failure protection by reallocating memory cells allocated to parity capacity to non-parity capacity.

8. A storage resource according to claim 6, the redundant storage array comprising a Redundant Array of Independent Disks (RAID).

9. A storage resource according to claim 6, the internal failure comprising a failure of one of the plurality of dies.

10. A storage resource according to claim 6, the management controller further configured to rebuild data associated with the internal failure to overprovisioned storage of the storage resource in response to write commands received from a storage controller communicatively coupled to the storage resource.

11. A method comprising:
    determining whether a storage resource configured to perform storage resource-level failure protection is a member of a redundant storage array;
    disabling storage resource-level failure protection of the storage resource in response to a determination that the at least one storage resource is a member of a redundant storage array;
    reporting an internal failure of the storage resource to a storage controller communicatively coupled to the storage resource; and
    communicating to a storage controller communicatively coupled to the storage resource an identity of at least one virtual address affected by the internal failure.

12. A method according to claim 11, wherein disabling storage the at least one storage resource comprises reallocating parity capacity of the at least one storage resource to non-parity capacity of the storage resource.

13. A method according to claim 11, the internal failure comprising a failure of a die integral to the storage resource.

14. A method according to claim 11, further comprising rebuilding data associated with the internal failure to overprovisioned storage of the storage resource in response to write commands received from a storage controller communicatively coupled to the storage resource.

* * * * *